Patented Jan. 14, 1930

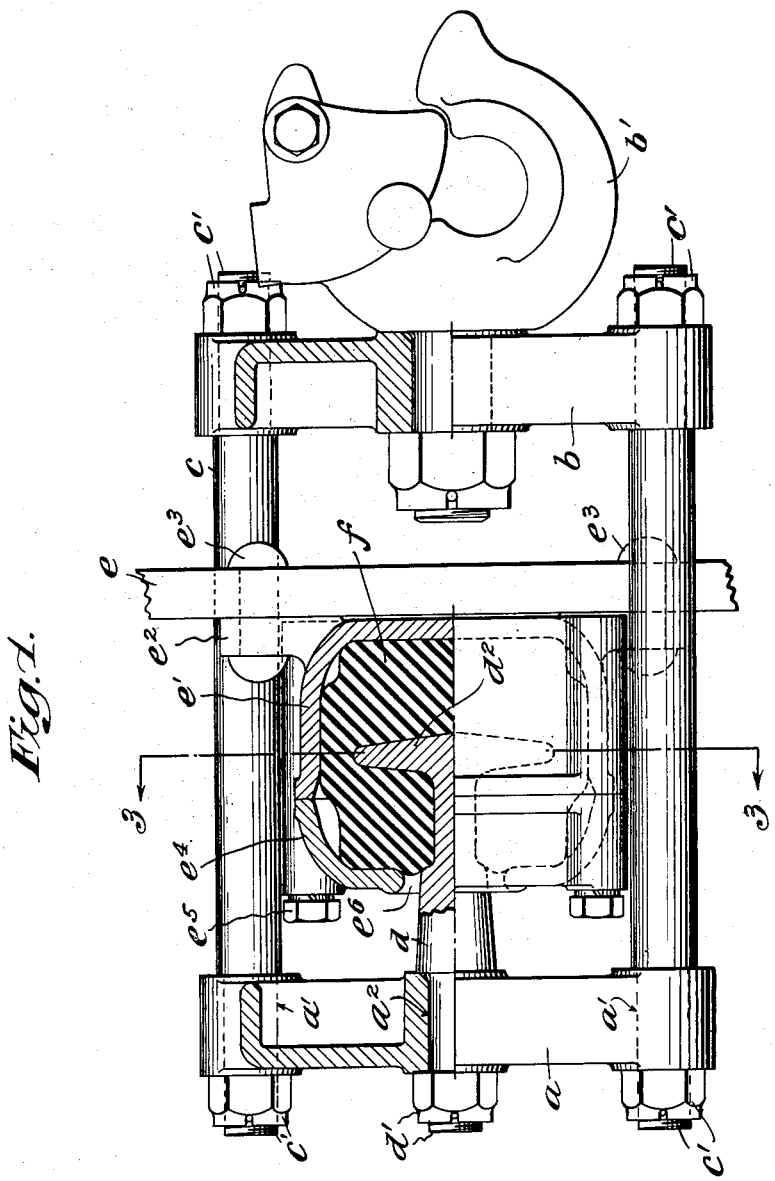

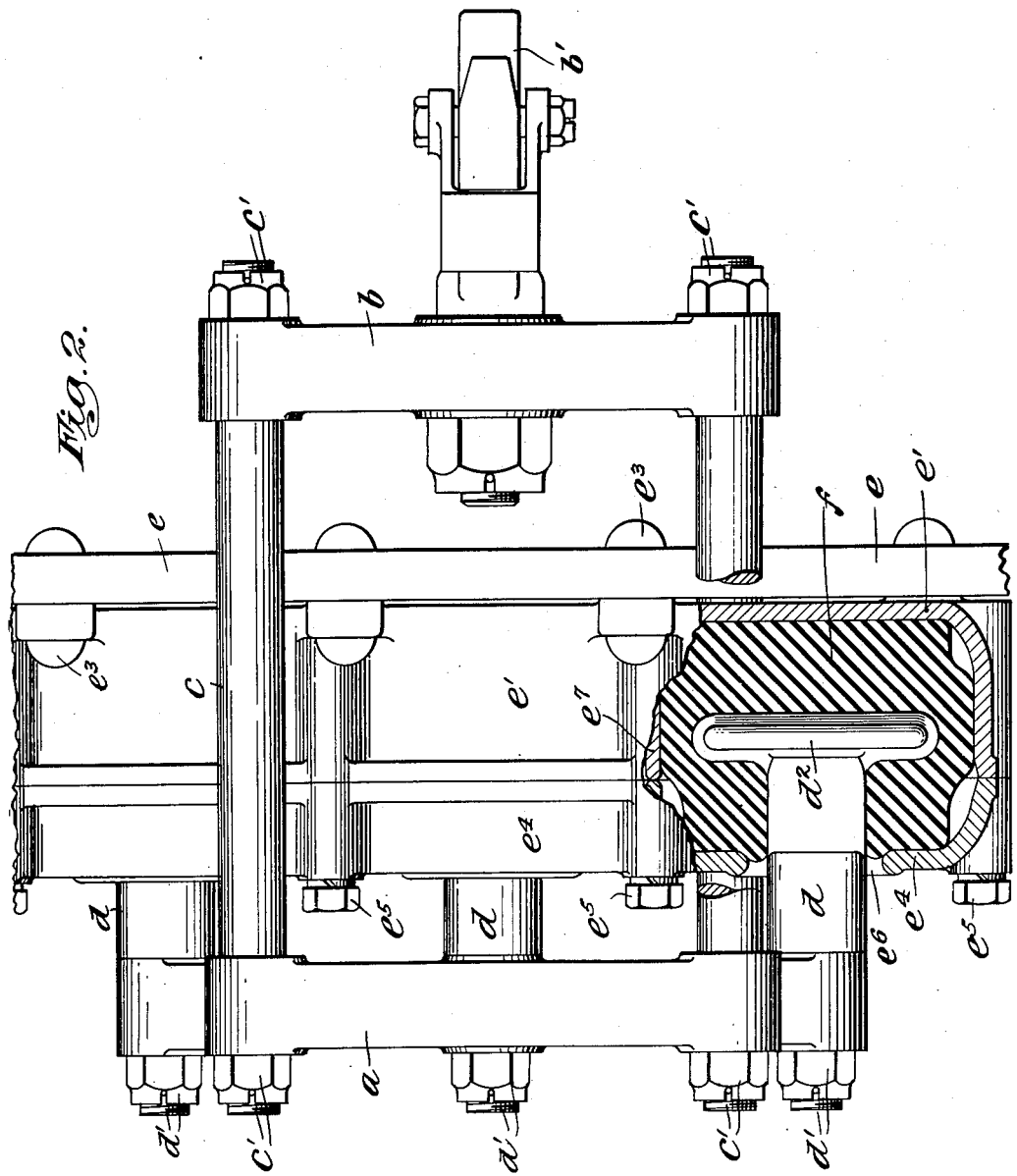

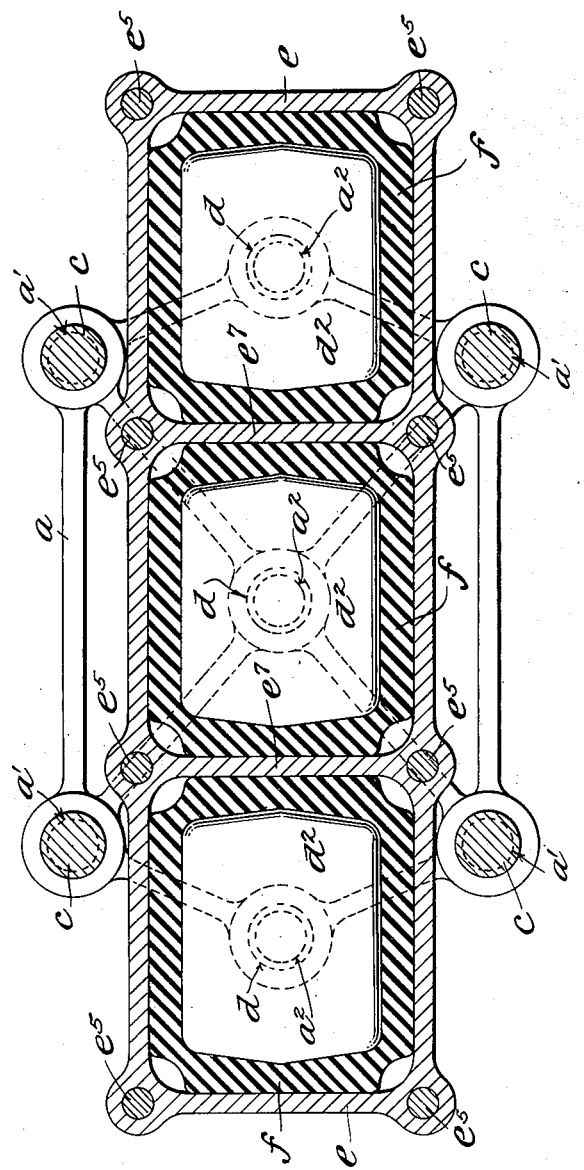

1,743,119

UNITED STATES PATENT OFFICE

ROBERT F. COWELL, OF TEANECK, NEW JERSEY, ASSIGNOR TO INTERNATIONAL MOTOR COMPANY, OF NEW YORK, N. Y., A CORPORATION OF DELAWARE

SHOCK-INSULATOR DRAWBAR

Application filed November 30, 1928. Serial No. 322,662.

The present invention relates to connections between a plurality of elements for transmitting forces therebetween. While, in its broad application, the invention relates to all mechanisms for transmitting forces between elements, whether the forces are of a restraining character or not, it relates specifically to draw bar connections between vehicles.

The invention embodies an improved connection of the above character which utilizes non-metallic yielding material to cushion the forces transmitted from one element to another. The common forms of draw bars, such as friction or metallic spring cushioned draw bars, have been in use for many years and it has been generally thought that the characteristics of rubber are such that its use as a cushioning element in connections of this character is impractical. The problem heretofore confronted has been that of providing a sufficient quantity of yielding non-metallic material to absorb the shocks and stresses incidental to the transmission of great forces between the several bodies.

An object of this invention is to provide a connection of the above character which utilizes yielding non-metallic material as a cushioning element and is designed in a manner such that the connection is not large or cumbersome and the quantity of yielding non-metallic material used is not excessive. It is proposed to provide a connection which subdivides the total quantity of yielding non-metallic material used, into a number of independent elements, each of which receives its proportionate share of the forces transmitted.

Further objects will appear as the invention is described in greater detail in connection with the accompanying drawings, wherein:

Figure 1 is a view in side elevation, partly broken away and in section, showing a preferred form of the invention.

Figure 2 is a plan view of the connection shown in Figure 1, a portion thereof being broken away to illustrate the details of the connection.

Figure 3 is a view in section, taken on line 3—3 of Figure 1, and looking in the direction of the arrows.

Referring to the above drawings, $a$ designates a back plate. This back plate is formed with a plurality of apertures $a'$ located at the corners of the plate $a$. A front plate $b$ is formed in a generally rectangular shape and provided with a hook $b'$ which is adapted to be connected to any member for applying a draft force as described hereinafter. Bars $c$ are connected between the front and back plates by means of bolts $c'$, these bars passing through the apertures $a'$ in the back plate $a$. Additional apertures $a^2$ are formed in the back plate and receive bearing arms $d$ which are secured to the back plate by means of bolt $d'$.

The vehicle, or object to which forces are to be applied, is formed with a plate $e$ through which the bars $c$ pass. Rearwardly of the plate $e$, a housing $e'$ is secured, webs $e^2$ being formed on the housing and bolted or riveted to the plate as shown at $e^3$. A cover $e^4$ is secured to the housing by means of bolts $e^5$, apertures $e^6$ being formed in the cover to receive the bearing arms $d$.

Within the housing $e$, compartments are formed by means of webs $e^7$, in the construction shown herein, three being provided. Blocks of yielding non-metallic material $f$ are carried within the compartments formed in the housing and placed under a suitable degree of compression by means of the cover $e^4$. The bearing arms $d$ are formed with bearing pads $d^2$ which are received within the blocks of yielding non-metallic material as shown in Figures 1 and 3.

It will be seen that a force applied to the hook $b'$ will be transmitted through the bars $c$ to the back plate $a$. From the back plate $a$ the forces are applied to the blocks of yielding non-metallic material $f$ through the bearing arms $d$. The blocks of yielding non-metallic material cushion the forces and transmit them to the housing and plate $e$ upon the desired object.

While the invention has been designed primarily as a draw bar connection between vehicles, its application may be extended to many analogous uses where forces are to be transmitted between several elements. Although the invention has been described with specific reference to the constructions shown in the accompanying drawings, it is not to be limited, save as defined in the appended claims.

I claim as my invention:

1. A device for transmitting forces between two members comprising a housing secured to one of the members, yielding non-metallic material in the housing, at least one arm formed with a bearing pad, said arm extending into the housing and said pad being seated within and surrounded by the yielding non-metallic material, and means to connect said arm to the other member, said last named means being entirely without the housing.

2. A device for transmitting forces between two members comprising a housing secured to one of the members, yielding non-metallic material in the housing, a plurality of arms formed with bearing pads, said arms extending into the housing and said pads being seated within and surrounded by the yielding non-metallic material, a plate to which all the arms are secured, and means to connect said plate to the other member including rods passing on opposite sides of the housing, a second plate secured to said rods, and coupling means attached to the last-named plate.

This specification signed this 26th day of November A. D. 1928.

ROBERT F. COWELL.